3,478,436
JIG MASTER
Clair E. Barnes, 4525 Keever Ave.,
Long Beach, Calif. 90807
Filed Aug. 22, 1967, Ser. No. 662,387
Int. Cl. G01b 5/00, 3/00
U.S. Cl. 33—170       2 Claims

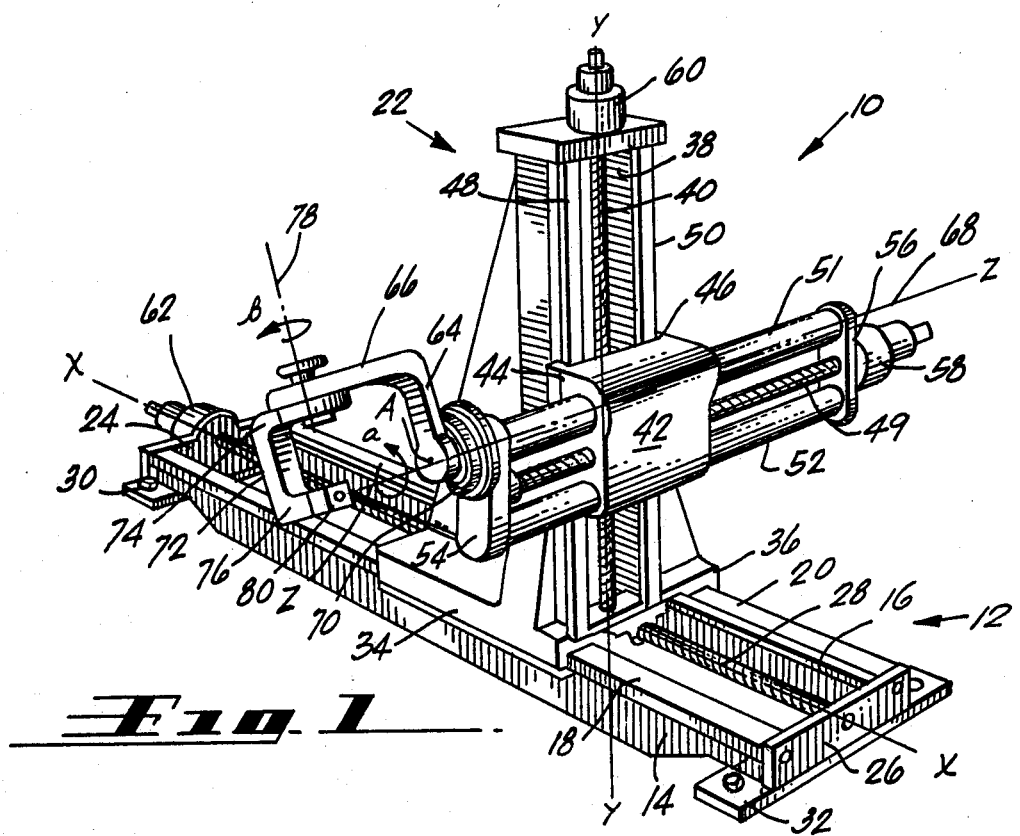

ABSTRACT OF THE DISCLOSURE

In a machine having X, Y, Z, Alpha and Beta axes settings, the specific correlation of the Alpha and Beta axes with the Z-axis so the center point of the operating head is always maintained at the intersection of the Alpha and Beta axes.

BACKGROUND OF INVENTION

This invention concerns itself with the field of machines which perform machining operations upon metal with a high degree of accuracy. Many such machines are capable of movement in five separate axes. Such machines are capable of moving the operating head in the common three dimensions, X, Y, and Z, and also the operating head is capable of rotating movement in a first axis, Alpha, which is perpendicular to the Z-axis, and in a second plane, Beta, which never intersects any portion of the Z-axis. The device of this invention is primarily concerned and applicable to such a five axis type of machine.

Heretofore, when it was desirable to move the operating head of a five axis machine, the X, Y, and Z coordinates were established and the machine so located. But, upon the positioning of the Alpha and Beta settings the X, Y, and Z axes usually had to be readjusted to compensate for a small amount of translation movement of the X, Y, and Z axes. This readjustment was quite time consuming especially when accomplished manually by the operator. The exact readjustment was difficult to calculate and therefore was only done visually.

One way in which the prior art attempted to solve this problem was in the use of computers. The computer equipment could be connected right to the machine, and upon the setting of the Alpha and Beta axes, the computer would be able to calculate accurately the amount of readjustment of the X, Y, or Z axis. The computer could be connected right to the machine and it, in itself, would direct the machine to make the necessary readjustment procedure. Thereby, the usual readjusting by the operator was eliminated. Obviously, the main disadvantage of such a solution is high cost in the use of such expensive and complex electronic equipment.

One type of apparatus in which it is necessary to locate several coordinates with extreme accuracy is an assembly jig. An assembly jig is essentially a template for an assembled piece of apparatus. The assembly jig is constructed of many fixed angle plates which are set in space at an extremely accurate position. The resultant assembly jig is then employed to assemble individual members of an assembled unit and then securely fasten them together. Such units could be an automobile door, an aircraft wing, an aircraft door, etc.

Heretofore, assembly jigs have been constructed by means of transits. The transits are employed as in any common surveying operation accurately to locate the desired point in space of each portion of the assembly jig. As the employing of transits is a quite meticulous operation, it would not be uncommon for it to take a week or more to construct the assembly jig as for a simple part such as an aircraft door. It is possible in the use of small assembly jigs that a computerized machine could be used; however, such computer machines usually cost upward of $250,000. To use such for the purpose of forming an assembly jig would be an expensive use of time for which such machine could be used to better advantage, as in machining high precision parts for which the computer machine is specifically designed. Therefore, usually transits are employed as the only means of forming an assembly jig.

SUMMARY OF THE INVENTION

This invention relates to the specific construction of the operating head of a five axis machine. Specifically, the operating head is movable about an Alpha axis and a Beta axis, a common plane being established by such axes. The Z-axis of the five axis machine always lies within the common plane of the Alpha and Beta axes and passes through the center point of the operational head of the machine. To locate the operational head at a certain position it is necessary to move the X, Y, and Z axes of the machines to their proper position and then position the operating head according to its Alpha and Beta settings. No readjustments of the X, Y, and Z axes are necessary due to the Alpha and Beta settings. The operational head is then positioned accurately at the desired coordinates.

The most distinct advantage of this invention over the prior art is that accurate settings on a five axis machine can be easily obtained within a relatively short period of time. The second advantage is that each of the five axis settings can be accomplished sequentially according to the desired coordinate position. Also, no readjustment of any of the previous settings upon the accomplishing of the last two settings, which are the Alpha and Beta settings, need be accomplished.

BRIEF DESCRIPTION OF THE DRAWING

FIGURE 1 is a pictorial view of a typical five axis type of machine embodying the operating head of this invention; and FIGURE 2 is a pictorial view showing the operating head of this invention in a plurality of positions as for establishing different points of an assembly jig for an aircraft door shown in phantom.

DESCRIPTION OF THE SHOWN EMBODIMENT

Referring specifically to the drawing, FIG. 1 shows a five axis type of machine which can be used for establishing the desired points of an assembly jig. Machine 10 has a base 12 comprised of longitudinal guide members 14 and 16. The top portion of each of the members 14 and 16 acts as ways 18 and 20 for the upright standard 22. The guide members 14 and 16 are connected together at each end by plates 24 and 26. Supported between plates 24 and 26 is an adjusting screw 28 which is mounted parallel to the guide members 14 and 16 and in between thereof. Adjacent each of the end plates 24 and 26 is a base plate 30 and 32 respectively, which is to be used to permanently affix the machine 10 to the supporting surface not shown.

The adjusting screw 28 is connected to upright standard 22 at its lower end thereof. By rotation of the screw 28 the upright standard 22 is moved in a direction parallel to the surface on which the machine is mounted. Usually the machine 10 is mounted so that this direction is substantially horizontal and is often termed as the X-axis. Upright standard 22 includes sliders 34 and 36 which are to cooperate with ways 18 and 20 of the base 12. Sliders 34 and 36 are constructed so that a non-play type of movement is achieved between the upright standard 22 and the base 12. Upright standard 22 has a longitudinal central opening 38 within which is mounted an adjusting screw 40. Adjusting screw 40 is connected to the horizontal standard 42 in the same manner as screw 28 was connected to standard 22. Standard 42 is movable in a vertical manner or rather substantially at a right angle to the X-axis. This movement is to be termed the Y-axis direction. The horizontal standard 42 is connected to standard 22 also by sliders 44 and 46 which are to cooperate with ways 48 and 50 on the upright standard 22.

Held within horizontal standard 42 is a third adjusting screw 49. The adjusting screw 49 is mounted to be perpendicular to the plane established by the X and Y axes. Guide rods 51 and 52 are supported within the horizontal standard 42, one on each side of the adjusting screw 49. The ends of the rods are interconnected by means of end plates 54 and 56. One end of the adjusting screw 49 is supported upon end plate 54 in a free manner. The other end of adjusting screw 49 passes through end plate 56 and is operated upon by motor 58 attached thereto. It is to be understood that adjusting screw 40 is also operated upon by a motor 60 and likewise adjusting screw 28 is operated upon by motor 62. The direction of movement which the adjusting screw 49 imparts is termed the Z-axis direction of the machine.

It is important to note that all the structure described up to now is common to not only all five axis machines, but also to machines having only three axes of movement. It is to be understood that while such description is necessary adequately to describe applicant's invention, the specific design of the three axis structure offers no specific part of this invention. It is desired that applicant should not be limited to such a three axis construction as has been described herein.

Attached to end plate 54 is an L-shaped arm having legs 64 and 66. Leg 64 is rotatingly mounted upon end plate 54 in such a manner that the longitudinal axis of leg 64 is perpendicular to the Z-axis. This movement of leg 64 constitutes the Alpha movement. The center of rotation of this leg 64, defined as point A on the drawing, lies on line 68 which defines the Z-axis. The rotational movement of leg 64 can be made in quite small angular increments. Vernier 70 is employed for such purpose.

Rotatingly attached to the extremity of leg 66 is a U-shaped operating head 72 having arms 74 and 76. Arm 74 is rotatingly attached to leg 66 so that the axis of rotation 78 intersects the line 68 (axis of rotation of leg 64). This movement of arm 74 constitutes the Beta movement. It is to be understood that arm 74 can be incrementally adjustable in the same manner that leg 64 is adjustable with respect to end plate 54 by vernier 70. The terminal end of arm 76 is in the shape of a small rectangular planar surface. However, it is to be understood that other configurations could be embodied as the terminal end of arm 76, such as, for example, a pointed surface might be desirable in some cases for inspection purposes or dimensioning. However, whatever type of surface is employed, the terminal end of such surface and the center point of such surface must be located at the intersection of the axis of rotation 78 and the Z-axis defined by line 68.

As can be seen from the drawing, whatever angle of rotation operating head 72 is positioned at, the center point of the master surface 80 will always be at the intersection of the axis of rotation 78 and line 68. Also, whatever angle of rotation leg 64 is moved through will not move the center point of the master surface 80 from this location. Because of this particular arrangement of the operating head 72, whatever angle leg 64 is positioned and whatever angle operating head 72 is positioned, the center point of the master surface 80 will not be displaced from the Z-axis. Therefore, when it is desired to locate a certain point in space and then to locate a certain plane about that point, the point can be established through the use of the X, Y, and Z coordinates. Having once so located the point through these coordinates, the angle of inclination of the plane to be positioned at that point can be so located through the use of the Alpha and Beta rotational movements defined through the movements of leg 64 and operating head 72. As previously stated, the location of such planes is highly desirable in the construction of assembly jigs. It has been found that an electronic read-back device has great utility in conjunction with applicant's apparatus. The read-back device is used to insure accurate manual settings of the five coordinate position.

In FIG. 2 the location is shown of three such planes for an assembly jig for an aircraft door (shown in phantom). Angle plate 82 is positioned to define the location and direction of installation of the center strut of the door. Angle plate 84 is used in the same manner to define one of the side struts of the door. And angle plate 86 defines the location of the lower end of one of the side struts of the door. Each of these angle plates are maintained in their respective positions through the use of steel supporting members such as 88. The angle plates are welded or otherwise securely fastened to such supporting members 88.

While the invention has been described in one embodiment, it is to be understood that the words which have been used are words of description rather than of limitation.

I claim:
1. In combination with a machine having an operating head, said operating head having a master surface, said master surface having a center point, said operating head being movable upon the three axes (X-axis, Y-axis and Z-axis) in the three dimensional rectangular coordinate system and additionally upon an Alpha axis of rotation and a Beta axis of rotation, the improvement comprising:
   said Alpha axis of rotation coinciding with said Z-axis and passes through said center point of said master surface; and
   said Beta axis of rotation intersects said Alpha axis in a perpendicular relationship at said center point of said master surface, whereby said center point of said master surface always lies on said Z-axis and said Alpha axis and said Beta axis regardless of the lineal position of said Z-axis and the angular position of said Alpha axis and said Beta axis.
2. The apparatus as defined in claim 1 wherein:
   said master surface comprises a planar surface whereby said planar surface can assume the angular position of different parts of an assembly jig.

References Cited

UNITED STATES PATENTS 3,279,079 10/1966 Schiler _____ 33—169
3,217,418 11/1965 Wennerberg _____ 33—172
3,100,346 8/1963 Cannon _____ 33—21

LEONARD FORMAN, Primary Examiner
F. J. D'AMBROSIO, Assistant Examiner